United States Patent [19]

Kneeland

[11] 4,305,257

[45] Dec. 15, 1981

[54] IN-LINE SLUSH MAKING PROCESS

[75] Inventor: Robert D. Kneeland, Schnecksville, Pa.

[73] Assignee: Air Products and Chemicals, Inc., Allentown, Pa.

[21] Appl. No.: 165,815

[22] Filed: Jul. 3, 1980

[51] Int. Cl.³ .............................................. F17C 11/00
[52] U.S. Cl. ........................................... 62/48; 62/66; 62/74; 106/97
[58] Field of Search ................. 62/48, 66, 74; 106/97, 106/98, 99

[56] References Cited

U.S. PATENT DOCUMENTS

| 3,643,002 | 2/1972 | Minnich | 62/55 |
| 3,646,998 | 3/1972 | Curtice | 106/98 |
| 3,672,182 | 6/1973 | Stowasser et al. | 62/98 |
| 3,730,201 | 5/1977 | Lefever | 62/55 |
| 4,052,220 | 10/1977 | Turpin, Jr. | 106/97 |
| 4,206,610 | 6/1980 | Santhanam | 62/55 |

*Primary Examiner*—Ronald C. Capossela
*Attorney, Agent, or Firm*—Thomas G. Ryder; E. Eugene Innis; James C. Simmons

[57] ABSTRACT

An improved process for producing a flowable liquid-solid mixture comprising a continuous liquid phase and a discontinuous solid phase comprised of discrete, frozen particles of the liquid, which process flowing a stream of the liquid through a closed conduit, introducing a cryogen into the closed conduit and into the flowing liquid stream so as to flow concurrently therewith, whereby the liquid-solid mixture is formed, and discharging the mixture from the conduit.

9 Claims, 1 Drawing Figure

U.S. Patent          Dec. 15, 1981          4,305,257
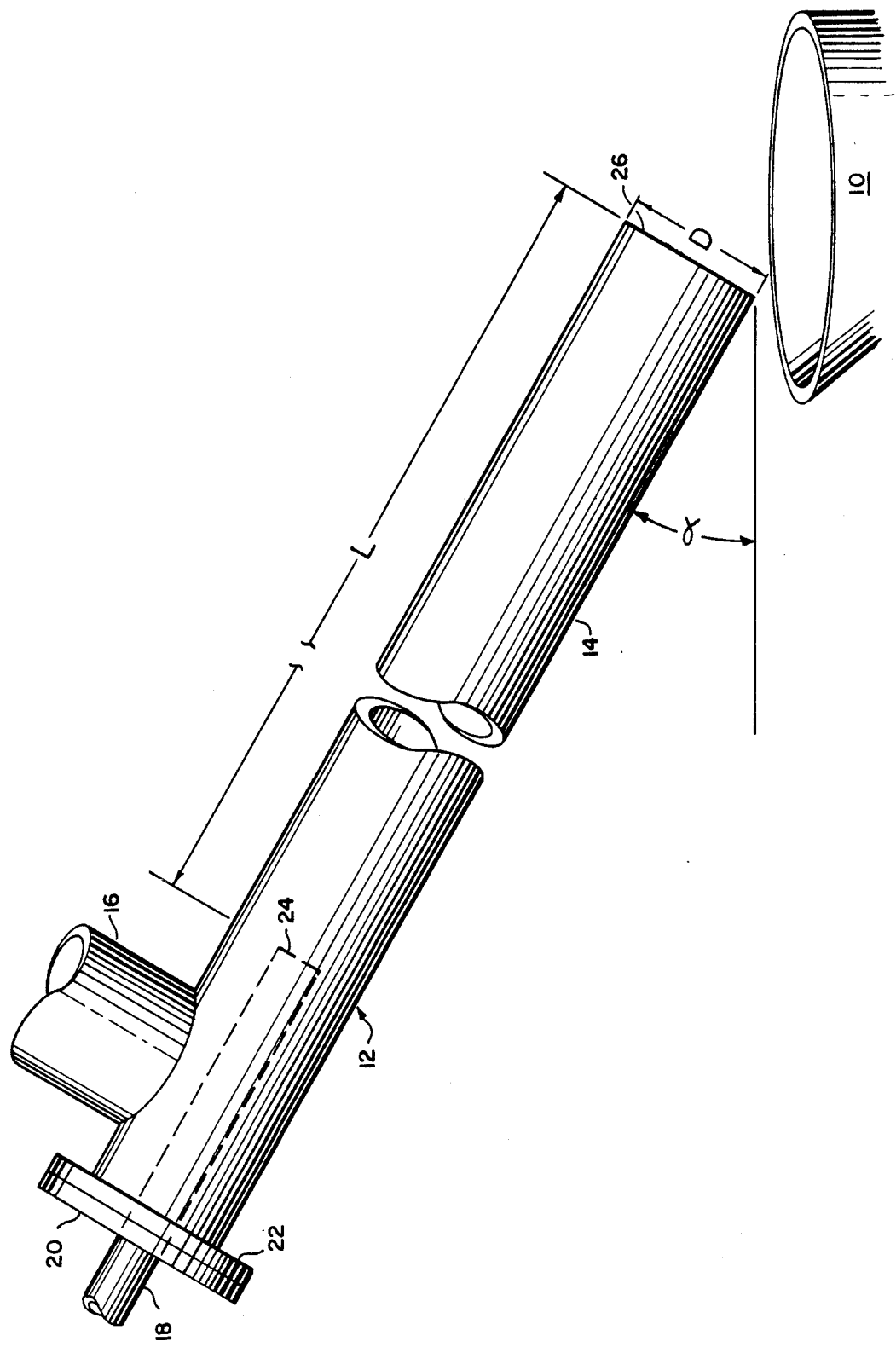

IN-LINE SLUSH MAKING PROCESS

This invention is directed to an improved process for producing a flowable liquid-solid mixture composed of a liquid mixed with discrete frozen particles of the liquid.

In various industrial processes wherein an initial relatively low temperature or wherein heat removal is desired, it has been suggested to provide cooling through the means of introducing to the process one or more of the ingredients which has been previously cooled. Processes of this type include concrete production and the synthesis of certain dye stuffs. Typically, these suggested techniques have been directed to the cooling of one of the liquid ingredients employed in the process, such as, for example, the cooling of water being introduced into a concrete production operation. In many situations, however, the amount of cooling or the amount of heat which can be removed or accomodated in this fashion is less than is desired and further steps must be taken. In this connection, it has also been suggested that the liquid ingredient could be frozen and introduced into the process in its solid form thereby taking advantage of the additional degree of cooling provided by the heat of fusion of this ingredient. This introduction of an aqueous component into a process in the form of ice has been suggested for use in the dyestuff industry and, more recently, it has been suggested in the production of concrete mixes in order to enhance the quality of the finished concrete as well as to meet recently imposed more rigid temperature specifications for the pouring of concrete.

The introduction of ice to such processes presents a problem in measuring accurately the precise quantity of ice employed and, thus, introduces an inaccuracy in measuring the total quantity of water present in the process. Further, there is a capital cost involved in such suggestions due to the necessity of providing the heavy ice crushers necessary to convert the ice from blocks of a size of 100 pounds or more to pieces small enough to provide rapid cooling and timely melting of the ice.

It has also been suggested to employ a cryogen, such as liquid nitrogen (LIN), for the indirect cooling of processes by passing the cryogen into a tank containing a liquid ingredient (e.g. water) and cooling the liquid to a level approaching its freezing point. Apparatus for implementing this suggestion is described in U.S. Pat. No. 3,672,182. Such technique, however, is limited in the amount of cooling which can be provided, since the introduction of more cryogen, beyond that necessary to reach the freezing point of the liquid, generally results in the formation of large chunks of frozen material which cannot readily be introduced into or accomodated in the process to be cooled.

DESCRIPTION OF THE PRESENT INVENTION

The present invention provides a simple and convenient process for producing a liquid-solid mixture (slush) in which the solid is the frozen form of the liquid part of the mixture. The present process also provides such a slush mixture which is flowable, thereby facilitating its introduction into a reaction zone or to another industrial process. This process can also form such slush mixture from a premeasured portion of the liquid component and can produce a slush having a predictable solid (ice) content, thus providing a predictable cooling capacity.

Generally, the present process is directed to the production of a flowable liquid-solid (slush) mixture comprising a continuous liquid phase and a discontinuous solid phase comprised of discrete frozen particles of the liquid. The process comprises flowing a stream of the liquid through a closed conduit and introducing a cryogen into the closed conduit and into the flowing liquid stream so as to flow concurrently therewith. The refrigeration capacity of the concurrently flowing cryogen effects the freezing of a portion of the flowing liquid stream. Since the liquid stream is moving and agitation is created by the expanding cryogen, the liquid freezes into small, discrete, solid particles thereby forming the slush mixture. Subsequent to formation of the slush, this liquid-solid mixture is then discharged from the conduit.

In the conduct of the process of this invention, it has been found that the initial temperature of the liquid stream, i.e. before contact with the cryogen, is generally an important consideration. There are reasons for preferably maintaining the initial temperature of the liquid stream somewhat above the freezing point of the liquid. As will be understood, the refrigeration capacity of liquid cryogens is great simply due to their extremely low temperatures, and the contacting of a cryogen with a normally liquid material at its freezing point would tend to result in substantially instantaneous freezing of the normally liquid material and the formation of frozen solid material on or about the cryogen inlet means. Although it has been suggested that the use of a heated lance such as that described in U.S. Pat. No. 3,672,182 would alleviate this condition, it is preferred to solve the problem by utilizing an initial temperature for the flowing stream which is at least 2° F. greater than the freezing point of such liquid. There does not appear to be any advantage in employing a temperature for the liquid stream which is greater than about 6° F. above the freezing point of the liquid. At the other end of the spectrum, any temperature which will maintain the flowing stream in the liquid state is operable, however, needlessly high temperatures are to be avoided. Generally, temperatures no greater than about 100° F. above the freezing point are preferred, with temperatures less than about 75° F. above the freezing point of the liquid being particularly preferred. When the liquid is water temperatures as high as 100° F., more frequently 80° F., can be employed satisfactorily.

In order to insure a constant movement of the normally liquid stream beyond the point at which the cryogen is introduced thereby avoiding formation of solids at the point of introduction of the cryogen and precluding the existence of quiescent conditions within the conduit which might lend themselves to the formation of larger particles of frozen solid material, it is important to maintain a minimum flow of liquid past the cryogen inlet. In this regard, it has been found that a superficial flow velocity for the liquid of at least about 1.5 feet per second is satisfactory. Preferably, the superficial velocity of the flowing liquid stream is at least about 2 or 2.5 feet per second, with superficial flow velocities of at least about 3 feet per second being particularly preferred. Normally, there is no advantage to be gained in using superficial flow velocities for the liquid stream in excess of about 15 feet per second. As used herein, the term superficial velocity has its usual meaning and is based upon the assumption that the particular fluid being considered occupies the complete cross-section of the conduit, while disregarding the presence of any other fluids which might, in fact, be present. Accordingly, the superficial velocity of the flowing liquid stream is calculated by dividing the flow rate of the liquid (volumes per unit time) by the cross-sectional area of the conduit thus yielding a velocity (expressed as units of length per unit of time). This calculation for the liquid is made without regard to space actually occupied by the cryogen within the conduit.

The time in which the cryogen and the liquid stream are in contact can vary over a substantial range depending upon a variety of factors including the size of the conduit, the length of the conduit and the relative amounts of liquid and cryogen being employed. Usually, this contact time, measured as the time interval from the point of introducing the cryogen into the flowing liquid stream to the point of discharging the slush, can be as low as about 0.001 second. Preferably, the contact time will be at least about 0.002 second and more preferably will be greater than about 0.005 second. As a practical matter, the contact time should be limited to something less than about 10 seconds, since most of the heat absorption by the cryogen occurs within a very short interval after introduction. Accordingly, contact times of less than about 5 seconds and even less than about 3 seconds are quite satisfactory. Typically, contact times will be less than about 2 seconds.

This rapid and efficient formation of the slush mixture is effected by maintaining a minimum weight ratio of cryogen to liquid of the flowing stream. It has been found that this weight ratio is at least about 0.025 to 1 and generally is at least about 0.1 to 1, with ratios greater than 0.2 to 1 being preferred. Conversely, it has been found that weight ratios in excess of about 2 to 1 provide no advantage and, accordingly, it is preferred to maintain such weight ratio at about 1 to 1 or less.

When operating within the ranges of the parameters set forth above, the process of this invention can be employed to treat quantities of a liquid stream flowing at rates as high as about 200 gallons per minute. Typically, most employments of this invention will be operating at flow rates of less than about 150 gallons per minute or even less than 100 gallons per minute. As a practical matter, in order to maintain the flow velocity required, the flow rate of the liquid stream will be at least about 20 gallons per minute. Flow rates for the cryogen which are compatible generally range from at least about 1 gallons per minute up to about 150 or 200 gallons per minute. The flow rate of both the liquid and the cryogen are dependent, as will be understood, on factors such as the heat of fusion of the liquid, the refrigeration capacity of the cryogen and the size of the conduit, among other things.

While operation in accordance with the process as described is generally effective to produce a flowable mixture of liquid and frozen solid, from time to time the process is subject to the problem of "ice" formation within the closed conduit. As will be understood the formation of "ice" adhering to the internal surfaces of the conduit will, at least, disrupt flow patterns and eventually will result in a substantially complete plugging of the conduit. While this buildup of the frozen solid within the conduit can be tolerated for short periods of time and/or when producing slush mixtures with a relatively low solid content, the problem becomes significant when high volume operation is desired or when it is desired to increase the solids content of the slush mixture in order to obtain greater cooling capacity. In this connection it has been noted that even when an "ice" free operation is being effected, at times increasing the quantity of cryogen introduced in order to increase the solids content of the slush, can result in the undesired formation of "ice" within the conduit. This is particularly so when attempts are made to increase the solids content of the slush to a level greater than about 15 or 20% by weight.

Accordingly, in accordance with a further discovery, it is preferred to control certain of the operating parameters of this process in order to effect the production of slush mixtures containing increased quantities of solids without the undesired formation of "ice" withing the closed conduit.

In this regard it is theorized that the formtion of obstructive masses of frozen liquid can be caused by super-cooling of the surfaces of the closed conduit by direct contact with the cryogen. This theory implies that the super-cooled spots on the interior surfaces of the closed conduit are at a substantially lower temperature than other points within the flowing liquid stream thereby causing the formation of adherent clumps of frozen liquid which eventually become obstructive. Accordingly, in accordance with this preferred method of operating the process, the operating conditions are selected so as to insure annular flow within the closed conduit whereby the liquid to be frozen flows along the walls of the pipe while the lighter, expanding and evaporating cryogen flows along the interior or the axis of the closed conduit. In such annular flow, the cryogen is prevented from contacting the walls of the conduit thereby preventing the formation of cold spots on which growth of coherent solid masses of frozen liquid can take place. Furthermore, when annular flow is achieved, theoretically all freezing takes place at or near the interface between the flowing liquid and the cryogen thus assisting in the formation of only small, discreet particles of solid which are separated from each other.

The factors which influence the character of two phase flow through closed conduits has been the subject of many investigations. A particularly useful analysis of two phase flow can be found in the article by Yemada Taitel and A. E. Duckler, published in the AIChE Journal (Volume 22, No. 1, January 1976, pages 47 through 55). These authors indicate that two important variables in the determination or definition of annular flow can be represented as two dimensionless groups, X and F, which the authors define as follows:

$$F = \sqrt{\frac{\rho_G}{\rho_L - \rho_G}} \frac{U_G^S}{\sqrt{Dg \cos\alpha}}$$

$$X = \sqrt{\frac{\frac{4C_L}{D}\left(\frac{U_L^S D}{V_L}\right)^{-n} \frac{\rho_L (U_L^S)^2}{2}}{\frac{4C_G}{D}\left(\frac{U_G^S D}{V_G}\right)^{-m} \frac{\rho_G (U_G^S)^2}{2}}}$$

In the above equations, the terms have the following meanings:
C = constant of the friction factor equation
D = diameter of the conduit
F = modified Froude number
G = subscript denoting cryogen
g = acceleration of gravity L=subscript denoting liquid phase
m/n=exponents related to type of flow
$U^S$=superficial velocity
V=kinematic viscosity
α=angle between the conduit and the horizontal
ρ=density In connection with this aspect of the invention, it has been found that the selection of operating parameters so as to insure a relationship between F and X, as those terms are defined above, will not only prevent the formation of obstructive masses of frozen liquid, but will also permit the ready formation of slush mixtures containing increased quantities of solid, for example, greater than about 20% solids. In fact, when operating within this regime, slush mixtures having a solids content of greater than 30 and even greater than about 50% are obtainable. The particular relationship which is to be maintained is such that the value for F is equal to or greater than about 9 ($X^{-1.8}$).

Although the selection of any operating parameters which will result in the stated relationship between F and X are acceptable, it is preferred to operate within certain selected ranges. Accordingly, it is preferable to orient the closed conduit such that the angle of the conduit relative to the horizontal is at least about 45°, and preferably is at least about 60°. Similarly, the superficial flow velocity of the cryogen is to be maintained at a level of at least about 0.2 feet per second, and preferably at least about 1 foot per second. Generally, there is no advantage to be gained in employing a superficial velocity for the cryogen greater than about 15 feet per second and, typically, the superficial velocity of the cryogen will be less than about 3 feet per second.

It is also important that a certain ratio be maintained between the superficial velocity of the flowing liquid and the superficial velocity of the cryogen. Insasmuch as the dimensions for the closed conduit for any particular system is fixed, this permits the ratio of superficial velocities to be expressed in terms of the more traditionally measured parameter of flow rate expressed as volumes per unit of time (e.g. gallons per minute GPM). Thus, when operating in this mode of the process, the flow rate of the cryogen relative to the flow rate of the liquid is usually in the range from about 0.02 to about 2, and preferably is in the range from about 0.25 to about 1.5.

Also within the general ranges established for the interrelationship of parameters immediately above, it has been found to be advantageous to employ a liquid flow rate of at least about 30 gallons per minute, and preferably at least about 40 gallons per minute.

As will be understood, the values for F and X, as well as the relationship between these two values, can also be varied by altering the diameter of the closed conduit. Normally, however, for control of any particular apparatus embodying the present process, control is effected by varying the superficial velocity of the cryogen, the ratio of the flow rate of the liquid to the flow rate of the cryogen, and the angle of the conduit to the horizontal.

DESCRIPTION OF THE DRAWING

In order to describe this invention in greater detail, reference is made to the attached drawing which is a representation of an apparatus suitable for practicing the process of this invention in connection with the production of an ice-water slush.

In the drawing, reference numeral 10 is used to indicate a hopper into which the slush mixture is delivered. Also shown in the drawing is a slush-making apparatus 12 embodying the present invention. This apparatus 12 is comprised of an elongated, cylindrical, slush lance 14 having a water inlet leg 16 connected to the slush lance 14 at a right angle thereto at the end of lance 14 remote from hopper 10. Extending into slush lance 14 from the end thereof remote from hopper 10 and disposed coaxially within lance 14 is LIN inlet line 18. This LIN inlet line 18 is maintained in sealing engagement with seal 20 which, in turn, is affixed to flange 22 on the end of lance 14 remote from hopper 10.

It will be noted that LIN inlet line 18 extends into lance 14 to a point some distance beyond the juncture of the water inlet leg 16 with the slush lance 14. This end of LIN inlet line 18 at the injection point of LIN into the apparatus is designated by reference numeral 24 for convenience sake. The end of lance 14 proximate hopper 10, from which the slush mixture made in the apparatus is discharged, is designated by reference numeral 26.

As can also be seen in the drawing, the inner diameter of slush lance 14 is designated by the letter D. Also in the drawing, the distance between the end of LIN inlet line 18, i.e, the LIN injection point 24, to the discharge end 26 of lance 14 is designated by the letter L. Finally, it will also be seen in the drawing that the angle that the lance 14 forms with the horizontal is designated by α.

In operation, water is flowed through water inlet leg 16 and is introduced into slush lance 14. While the water is flowing through lance 14, LIN is introduced into the apparatus 12 by means of LIN inlet line 18 so that after injection of the LIN, it will be flowing concurrently with the water within lance 14. The slush mixture formed within lance 14 through contact of the LIN and water is discharged from lance 14 at the discharge end 26 thereof.

In connection with the apparatus shown in the drawing, it is found that generally the length, L, from the LIN injection point 24 to the discharge end 26 of lance 14 is to be at least about three times the inner diameter, D, of lance 14. Usually, however, the ratio of L:D is at least about 10 to 1 and even about 20 to 1. Particularly preferred embodiments utilize an L:D ratio of 30:1 or 40:1, or even higher. On the other hand, however, an excessively high L:D ratio provides no advantage and at times may even be counterproductive due to the fact that the slush mixture may tend to warm again if the lance is too long. In this connection, it is preferred to maintain the L:D ratio at less than about 200:1 and more preferably at less than about 150:1 or even less than about 100:1.

In order to illustrate this invention in greater detail, reference is made to the following example in which an apparatus generally of the type described in connection with the drawing was employed in a plurality of runs to produce an ice-water slush under a variety of operating conditions.

In the particular apparatus employed for these runs, the length, L, was 10 feet, and the ID of the slush lance, D, was 3 inches. The particular material of fabrication was schedule 40 steel pipe. The cryogen, LIN, was introduced through a LIN inlet line having a 1-inch ID, and the LIN injection point (reference numeral 24 in the drawing) was located 2 inches beyond the water inlet leg (reference numeral 16 of the drawing). The apparatus was also fabricated so that the angle of inclination (α) of the lance 14 could be varied over a wide range.

The particular operating conditions employed, including water and LIN flow rates, superficial velocity of the LIN (calculated at the LIN injection point 24), the calculated values for X, F and their critical relationship, are all shown in Table I below. Also indicated in Table I are the quantities of slush determined for each of the runs as well as comment regarding its operation.

TABLE I

| Run No. | Water Flow Rate gpm | LIN Flow Rate gpm | $U_G^S$ LIN fps | Angle $\alpha$, ° | X | F | $9(X^{-1.8})$ | Slush wt. % | Comment |
|---|---|---|---|---|---|---|---|---|---|
| 1 | 25 | 7.0 | 0.31 | 0 | 4.6 | 0.19 | 0.58 | 20 | Froze |
| 2 | 25 | 9.0 | 0.39 | 0 | 3.7 | 0.24 | 0.85 | 27 | Froze |
| 3 | 25 | 11.1 | 0.48 | 0 | 3.1 | 0.29 | 1.17 | 34 | Froze |
| 4 | 50 | 6.5 | 0.28 | 0 | 9.2 | 0.17 | 0.17 | 7 | OK |
| 5 | 50 | 10.4 | 0.45 | 0 | 6.1 | 0.28 | 0.35 | 14 | Anomalous |
| 6 | 50 | 12.0 | 0.52 | 0 | 5.3 | 0.32 | 0.45 | 17 | Froze |
| 7 | 50 | 13.5 | 0.59 | 0 | 4.8 | 0.36 | 0.53 | 19 | Froze |
| 8 | 75 | 12.7 | 0.55 | 0 | 7.3 | 0.34 | 0.25 | 11 | OK |
| 9 | 75 | 14.7 | 0.64 | 0 | 6.4 | 0.39 | 0.32 | 13 | OK |
| 10 | 50 | 9.8 | 0.43 | 45 | 6.4 | 0.31 | 0.32 | 13 | Froze |
| 11 | 50 | 7.2 | 0.31 | 45 | 8.2 | 0.23 | 0.20 | 8 | OK |
| 12 | 50 | 8.3 | 0.36 | 45 | 7.2 | 0.26 | 0.25 | 10 | OK |
| 13 | 50 | 9.8 | 0.43 | 45 | 6.4 | 0.31 | 0.32 | 13 | Froze |
| 14 | 80 | 33.4 | 1.46 | 64 | 3.2 | 1.3 | 1.11 | 32 | OK |
| 15 | 80 | 37.5 | 1.64 | 64 | 2.9 | 1.5 | 1.32 | 37 | OK |
| 16 | 80 | 41.9 | 1.83 | 64 | 2.6 | 1.7 | 1.61 | 41 | OK |
| 17 | 80 | 43.7 | 1.91 | 64 | 2.5 | 1.8 | 1.73 | 43 | OK |
| 18 | 80 | 29.1 | 1.27 | 72 | 3.6 | 1.4 | 0.90 | 27 | OK |
| 19 | 80 | 42.0 | 1.83 | 72 | 2.6 | 2.0 | 1.61 | 41 | OK |
| 20 | 80 | 56.4 | 2.46 | 72 | 2.0 | 2.7 | 2.58 | 57 | OK |

Referring now to the data in Table I, it will be noticed that runs 1 through 9 were conducted employing a slush lance in a horizontal position, as indicated by value 0 for alpha. In these runs, the flow rate of the water varied from 25 gpm to 75 gpm. Within each of these groupings of water flow rates, the data are displayed showing an increase in the LIN flow rate. From these data, it can also be seen that slush containing from 7 to about 34 percent solids was obtained. As might be expected, increasing the LIN flow rate while maintaining a constant flow rate for the water did result in an increase in the amount of slush produced. Referring specifically to the series of runs Nos. 4 through 7, it can be seen that run 4 employing a LIN flow rate of 6.5 gpm and wherein the value for F was equal to the term $9(\times^{1.8})$, the process was capable of producing 7 percent solids slush and that there was no freezing problem. Run No. 5 is presented as merely an anomolous data point. In runs 6 and 7, however, increasing the LIN flow rate did, in fact, result in an increase in the percent solids in the slush, but resulted in a value for F which was below that required by the present invention and freeze-up of the apparatus occurred. Runs 8 and 9 are illustrative of an operation wherein the F value was maintained consistently above the minimum level, resulting in the production of a slush mixture without freeze-up of the apparatus.

Runs 10 through 13 demonstrate the effect of varying LIN flow rate relative to water flow rate, while employing an inclined slush lance. Again, when the value of F was maintained at a sufficiently high level, the process was effective to produce an ice-water/slush mixture without freeze-up of the apparatus.

Runs 14 through 20 illustrate the employment of an extremely high flow rate of water of 80 gpm. In these runs, the process was controlled both by increasing the LIN flow rate and increasing the value of the angle $\alpha$. Within the grouping of runs 14 through 17, it can be seen that the increase in LIN flow rate resulted in a steady increase in the percent solids of the slush while maintaining the value of F above the minimum acceptable level, thereby avoiding freeze-up. In all of these runs, the percent of solids in the slush exceeded 30 percent.

In runs 18 through 20 the slush lance was placed at an angle of 72°, and the quantity of LIN employed was varied over a substantial range. Again it would be noted that the value of F was maintained above the minimum acceptable value described by this invention and that freeze-up of the apparatus was avoided, even though slush having a solid content of greater than 50 percent was obtained.

What is claimed:

1. An improved process for producing a flowable liquid-solid mixture comprising a continuous liquid phase and a discontinuous solid phase comprised of discrete, frozen particles of the liquid, which process comprises flowing a stream of the liquid through a closed conduit, introducing a cryogen into the closed conduit and into the flowing liquid stream so as to flow concurrently therewith, whereby the liquid-solid mixture is formed, and discharging the mixture from the conduit, the contact time between introduction of the cryogen and discharge of the mixture being maintained from about 0.001 to about 10 seconds, the superficial velocity of the flowing liquid being at least about 1.5 feet per second, the weight ratio of cryogen to liquid being maintained from about 0.025:1 to about 2:1 and the flow rate of the liquid relative to the flow rate of the cryogen, the superficial flow velocity of the cryogen, the diameter of the conduit and the angle of the conduit with the horizontal being selected such that the value for F is equal to or greater than about $9(\times^{-1.8})$ wherein F and X are defined by the following two equations:

$$F = \sqrt{\frac{\rho_G}{\rho_L - \rho_G}} \frac{U_G^S}{\sqrt{Dg \cos\alpha}}$$

$$X = \sqrt{\frac{\frac{4C_L}{D}\left(\frac{U_L^S D}{V_L}\right)^{-n} \frac{\rho_L (U_L^S)^2}{2}}{\frac{4C_G}{D}\left(\frac{U_G^S D}{V_G}\right)^{-m} \frac{\rho_G (U_G^S)^2}{2}}}$$

in which C is a constant of the friction factor equation, D is the diameter of the conduit, F is a modified Froude number, g is the acceleration of gravity, m and n are exponents indicative of the type of flow, $U^s$ is the superficial flow velocity, $\alpha$ is the angle between the conduit and the horizontal, $\rho$ is density, V is kinematic viscosity, G is a subscript denoting the cryogen and L is a subscript denoting the liquid.

2. The process of claim 1 wherein $\alpha$ is greater than about 45°.

3. The process of claim 1 wherein $\alpha$ is greater than about 60°.

4. The process of claim 1 wherein the flow rate of the cryogen relative to the flow rate of the liquid is from about 0.02:1 to about 2:1.

5. The process of claim 1 wherein the flow rate of the cryogen relative to the flow rate of the liquid is from about 0.25:1 to about 1.5:1.

6. The process of claim 1 wherein the superficial flow velocity of cryogen is from about 0.2 foot per second to about 15 feet per second.

7. The process of claim 1 wherein the discontinuous solid phase comprises at least about 30% by weight of the mixture.

8. The process of claim 1 wherein the length of the closed conduit from the point of introduction of the cryogen to the point of discharge into the mixture is at least 3 times the diameter of the conduit.

9. The process of claim 7 wherein the length of the conduit is at least 10 times the diameter of the conduit.

* * * * *